(12) United States Patent
Samuelson et al.

(10) Patent No.: US 6,255,609 B1
(45) Date of Patent: Jul. 3, 2001

(54) HIGH PRESSURE RESISTANT, LOW PRESSURE ACTUATING SENSORS

(75) Inventors: Duane Samuelson; Stephen Kaylor; Gordon Yowell, all of Boca Raton; Alvin S. Blum, Fort Lauderdale, all of FL (US)

(73) Assignee: Predator Systems, Inc., Boca Raton, FL (US)

( * ) Notice: Subject to any disclaimer, the term of this patent is extended or adjusted under 35 U.S.C. 154(b) by 0 days.

(21) Appl. No.: 09/603,784

(22) Filed: Jun. 26, 2000

(51) Int. Cl.$^7$ .............................. H01H 35/40; G01L 7/08
(52) U.S. Cl. .................. 200/83 L; 200/82 E; 200/83 R; 73/715; 73/719; 73/722; 73/725; 73/728
(58) Field of Search ........................... 200/81 R, 81.9 M, 200/82 E, 83 R, 83 L; 73/715–731

(56) References Cited

U.S. PATENT DOCUMENTS

| | | |
|---|---|---|
| 4,049,935 | 9/1977 | Gruber . |
| 4,317,971 | 3/1982 | Roth . |
| 4,456,801 | 6/1984 | Lauritsen . |
| 4,637,258 | 1/1987 | Priest . |
| 4,827,095 | 5/1989 | Clark . |

Primary Examiner—Ramon M. Barrera
(74) Attorney, Agent, or Firm—Alvin S. Blum

(57) ABSTRACT

Sensors for mounting in fluid chambers respond electrically to low pressures in the fluid, while resisting damage or leakage at high pressures. A flexible diaphragm, mounted at one end of a housing, is sandwiched between first and second annuli, leaving a center portion free to move in response to fluid pressure changes. The diaphragm moves a cylinder, which reciprocates in the second annulus against an adjustable spring bias. Travel of the cylinder away from the fluid is limited by a stop. Once the stop is reached, increased pressure on the diaphragm forces it against a fixed wall composed of a face of the second annulus and a face of the cylinder. The forces on the diaphragm are then all compressive. This enables the use of an easily flexed diaphragm for low pressure sensitivity, while resisting damage from high pressures. The moving cylinder is used to move a magnet that actuates a Hall effect switch, a Hall effect analog output transducer, or a reed switch. In alternative embodiments, the cylinder actuates a mechanical switch or variable resistor.

18 Claims, 3 Drawing Sheets

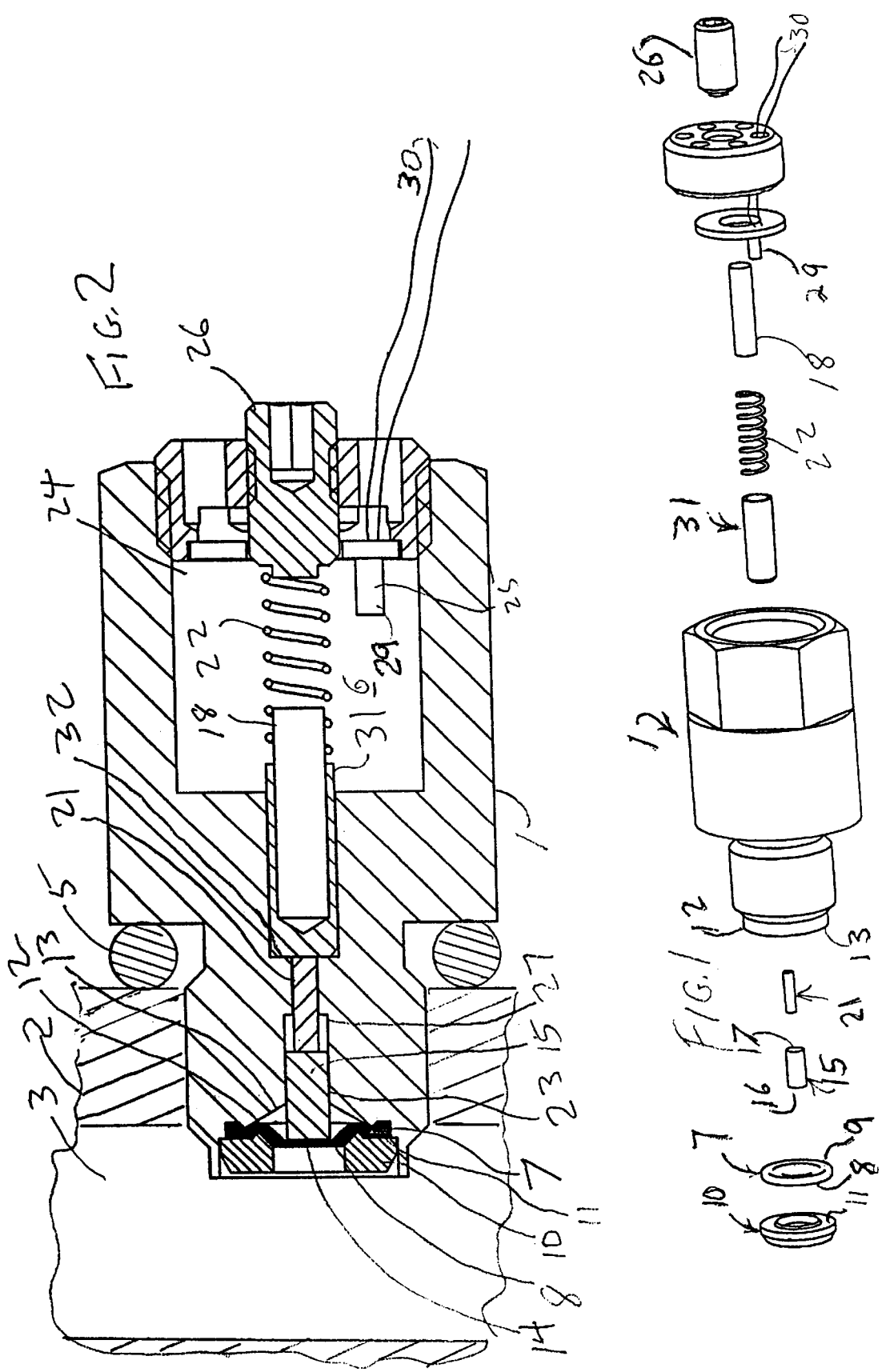

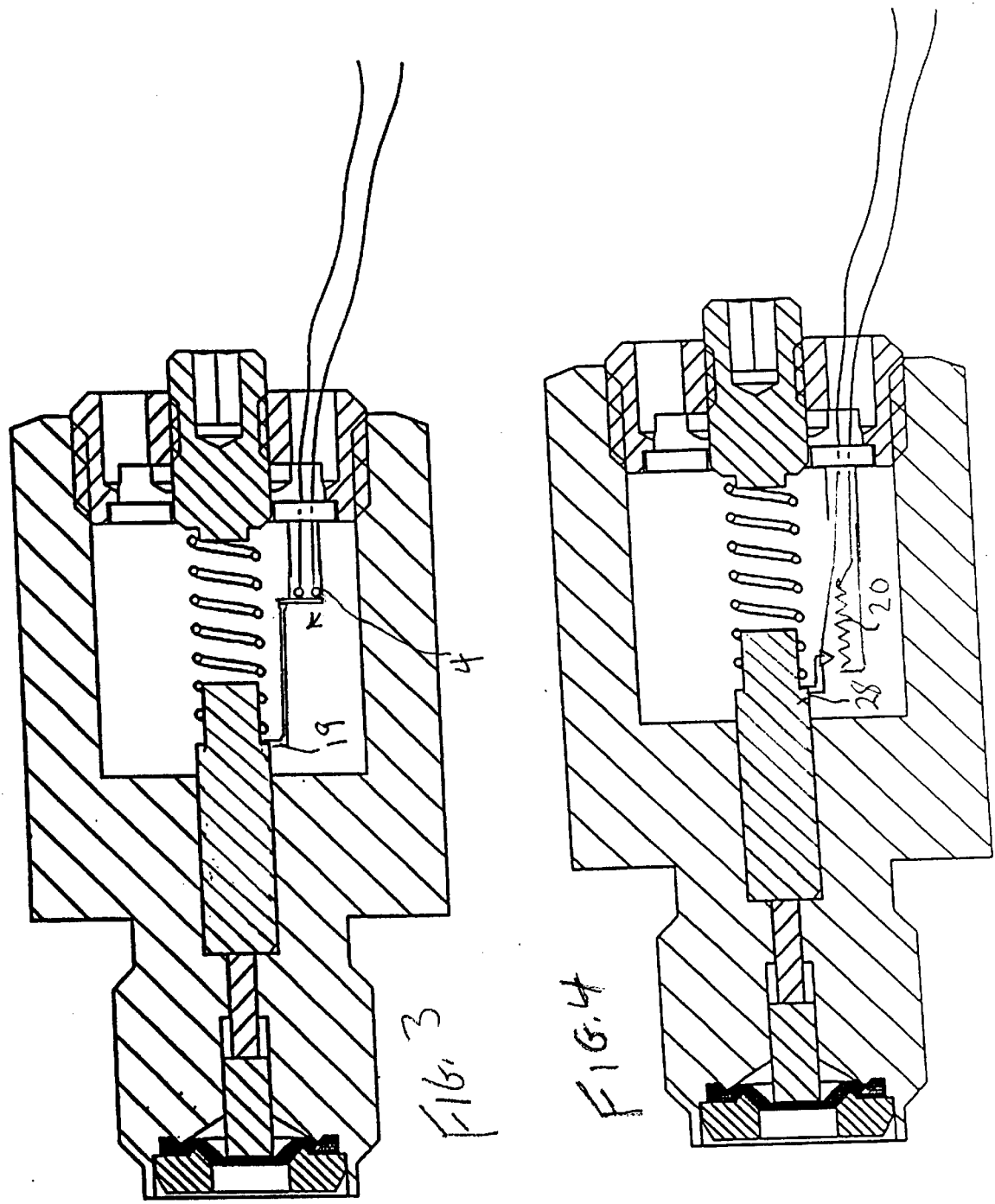

HIGH PRESSURE RESISTANT, LOW PRESSURE ACTUATING SENSORS

BACKGROUND OF THE INVENTION

This invention relates to pressure actuated switches and sensors, and more particularly to electric switches and sensors that do not fail or leak when exposed to very high pressures, and yet are actuated by very low pressures.

DESCRIPTION OF THE PRIOR ART

It is well known in the art of fluid pressure sensing mechanisms to employ the motion of flexible diaphragms having one face in contact with the fluid to have the opposite face of the diaphragm operate a switch or sensor. It is important to seal the diaphragm so that the fluid pressure is sensed by only one face to enable the diaphragm to respond to the pressure difference between the two faces. It is also important that device not leak fluid to the outside. There are two generally conflicting requirements of the diaphragm. It must be sufficiently flexible to respond to the pressures to be sensed. It must be sufficiently strong that it will not fail at the maximum pressures to which it will be exposed. In certain applications, quite low pressures, such as 50 P.S.I. must be sensed, and 7,500 P.S.I. may be encountered. The prior art devices have not adequately resolved this conflict.

SUMMARY OF THE INVENTION

It is accordingly an object of the invention to provide a pressure sensing diaphragm mechanism that is responsive to very low pressures, while resistant to failures, such as leakage or rupture, at fluid pressures that are very high. The apparatus of the invention comprises a flexible diaphragm that is exposed on one face to the fluid to be measured, and that moves a sensing means with the opposite face. The diaphragm is so mounted that its maximum travel under pressure forces its entire opposite face against a rigid surface. The diaphragm is then only subject to compressive forces, that are easily supported without damage. These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 1 is an exploded view of an apparatus of the invention.

FIG. 2 is a cross sectional view of the assembled apparatus of FIG. 1.

FIG. 3 is a cross sectional view of another embodiment of the invention.

FIG. 4 is a cross sectional view of another embodiment of the invention.

DETAILED DESCRIPTION OF PREFERRED EMBODIMENTS

Figure 5:
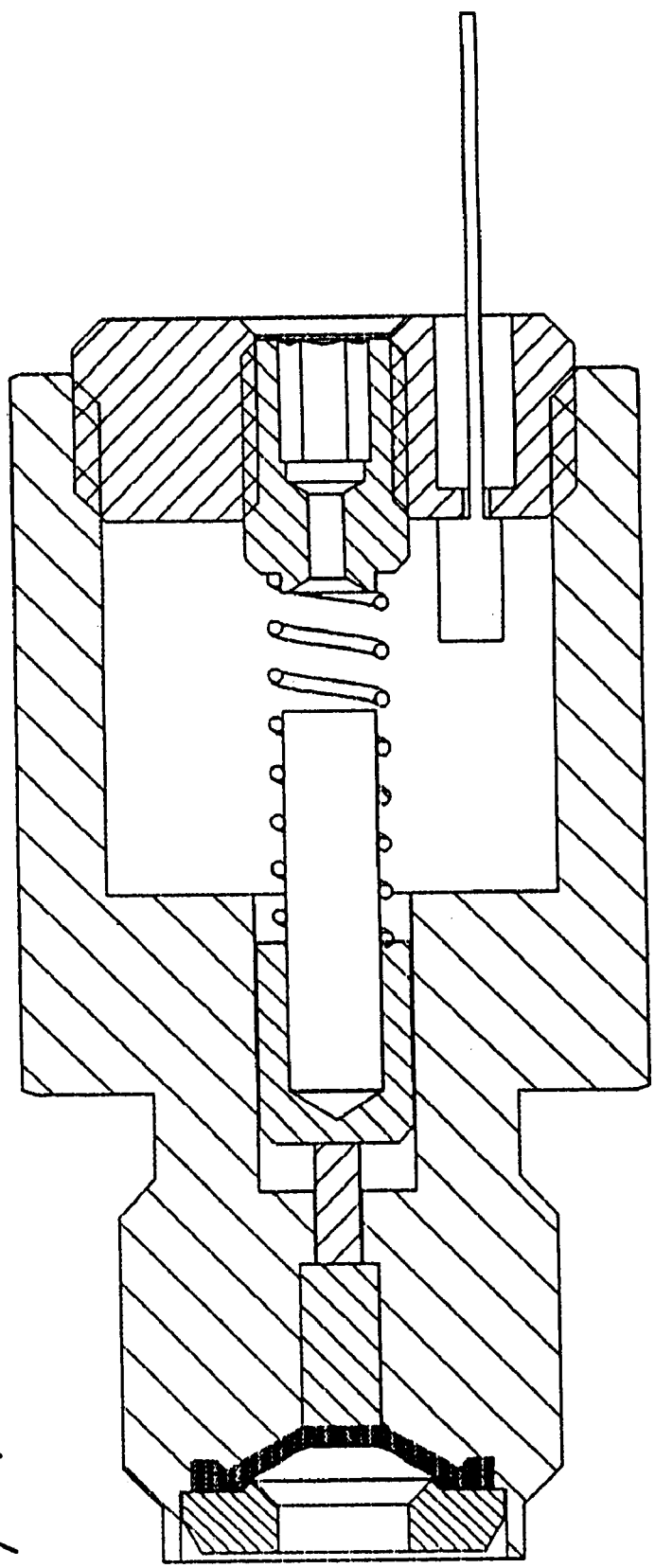
FIG. 5 is a cross sectional view of the apparatus of FIG. 1 in the maximum pressure condition.

Referring now to FIGS. 1 and 2, a sensor apparatus 29 has electric output 30 responsive to very low pressures, such as less than 50 P.S.I., in a fluid 3 in a chamber 2. A rigid housing 1, with internal space 6, is screwed into chamber 2, and sealed against very high pressures, such as 7,500 P.S.I., by sealing means O-ring 5. A flexible diaphragm 7 is sealed to the first end 23 of the housing against high pressure by a first annulus 10 having a face 11 pressing against a first face 8 of the diaphragm, forcing the second face 9 of the diaphragm against a diaphragm face 13 of a second annulus 12 that is affixed to, or integral with, the housing. The first annulus 10 is then staked into the housing to fix the diaphragm in sealed position. This leaves a central portion 14 of the diaphragm free to flex in response to pressure differentials between its two faces.

A piston or cylinder reciprocates within fixed annulus 12 with a close sliding fit. The cylinder 15 has a first end 16 that engages, and moves with, the central portion 14 of the diaphragm. A second end 17 of the cylinder is limited in its travel away from the fluid by stop element 27, which is arranged to be at or above the maximum sensitivity required. When the cylinder is at the stop, the diaphragm can flex no more. Its face 9 is pressed against a rigid wall comprised of the face 13 of the second annulus 12 and the first end 16 of the cylinder, which is aligned with the face 13. Any greater fluid pressure only produces compressive forces on the diaphragm, which are easily taken without damage by even a very flexible diaphragm required for response to very low pressures. Fixed annulus 12 may be formed in one piece with the housing as shown, or as a separate element that is affixed to the housing (not shown).

A magnetically actuated switch or transducer 25 is mounted at the second end 24 of the internal space with electrical wires 30 extending therefrom. This may be a Hall-effect switch assembly that provides a discrete on or off at a particular magnet position, it may be a reed switch that provides a discrete on or off at a particular magnet position, or a Hall-effect transducer whose output is proportional to magnet position. A magnet 18 is mounted in magnet carrier 31 that has a sliding fit in the housing. A connecting rod 21 slidably mounted in the housing connects the end 17 of the cylinder to the magnet carrier 31. Spring bias means 22 urges the carrier and attached magnet 18 away from the switch or transducer 25 until second stop element 32 is reached. This causes the diaphragm to bulge toward the fluid by a precisely limited amount. An adjusting screw 26 engaging one end of the spring 22 enables the device to be responsive to different pressures by adjusting the force required to move the magnet against the spring bias from its low pressure position to its high pressure position. In the alternative embodiment shown in FIG. 3, a mechanically actuated switch 4 is actuated by movement of actuating means 19 driven by the diaphragm as disclosed supra. In the alternative embodiment shown in FIG. 4, a mechanically actuated variable resistor 20 is actuated by movement of actuating means 28 driven by the diaphragm as disclosed supra.

The above disclosed invention has a number of particular features which should preferably be employed in combination, although each is useful separately without departure from the scope of the invention. While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A pressure actuated switch mechanism for sensing low pressures within a chamber containing fluid, while resisting failure by much higher pressures, the switch mechanism comprising:

a) a housing adapted for affixing to the chamber, the housing provided with sealing means for sealing against leakage of the fluid from the chamber at very high pressures;
b) an internal space within the housing;
c) a flexible diaphragm mounted at a first end of the internal space, the diaphragm separating the internal space from the chamber contents, the diaphragm positioned with a first face exposed to the fluid, and an opposed second face exposed to the internal space;
d) a first annulus connected to the housing and having a face pressed against the first face of the diaphragm;
e) a second annulus on the housing and having a diaphragm face pressed against the second face of the diaphragm, such that the diaphragm is sealingly sandwiched between the two annuli with only a center portion of the diaphragm movable;
f) a cylinder fitting in the second annulus with a sliding fit and having a second end, and a first end to engage, and move with, the second face of the diaphragm as pressure is applied to the first face of the diaphragm;
g) a permanent meet arranged to reciprocate within the internal space between a first, low pressure position toward the diaphragm and a second, high pressure position away from the diaphragm;
h) a switch means attached to the housing at a second end of the internal space for actuation by proximity of the magnet;
i) spring bias means for urging the magnet to the first position;
j) means operatively connecting the second end of the cylinder to the magnet so as to cause the magnet to move with the diaphragm; and
k) stop means for limiting movement of the cylinder so that its first end is aligned with the diaphragm face of the second annulus at maximum movement under the force of the diaphragm, thereby presenting a rigid surface against which the diaphragm is pressed to protect the diaphragm from damage by great pressure applied to its first face.

2. The switch mechanism according to claim 1, in which the switch means is a Hall-effect device.

3. The switch mechanism according to claim 1, in which the switch means is a reed switch.

4. The switch mechanism according to claim 3, in which the spring bias means is adjustable.

5. The switch mechanism according to claim 2, in which the spring bias means is adjustable.

6. The switch mechanism according to claim 1, in which the spring bias means is adjustable.

7. A pressure actuated apparatus for sensing pressure within a chamber containing fluid, the apparatus comprising:
a) a housing adapted for affixing to the chamber, the housing provided with sealing means for sealing against leakage of the fluid from the chamber at very high pressures;
b) an internal space within the housing;
c) a flexible diaphragm mounted at a first end of the internal space, the diaphragm separating the internal space from the chamber contents, the diaphragm positioned with a first face exposed to the fluid, and an opposed second face exposed to the internal space;
d) a first annulus connected to the housing and having a face pressed against the first face of the diaphragm;
e) a second annulus on the housing and having a diaphragm face pressed against the second face of the diaphragm, such that the diaphragm is sealingly sandwiched between the two annuli with only a center portion of the diaphragm movable;
f) a cylinder fitting in the second annulus with a sliding fit and having a second end, and a first end to engage, and move with, the second face of the diaphragm as pressure is applied to the first face of the diaphragm;
g) a permanent magnet arranged to reciprocate within the internal space between a first, low pressure position toward the diaphragm and a second, high pressure position away from the diaphragm;
h) a transducer attached to the housing at a second end of the internal space arranged to cooperate with the magnet to provide an electrical response to diaphragm position;
i) spring bias means for urging the magnet to the first position;
j) means operatively connecting the second end of the cylinder to the magnet so as to cause the magnet to move with the diaphragm; and
k) stop means for limiting movement of the cylinder so that its first end is aligned with the diaphragm face of the second annulus at maximum movement under the force of the diaphragm, thereby presenting a rigid surface against which the diaphragm is pressed to protect the diaphragm from damage by great pressure applied to its first face.

8. The apparatus according to claim 7, in which the transducer is a Hall-effect device.

9. The apparatus according to claim 8, in which the spring bias means is adjustable.

10. The apparatus according to claim 7, in which the spring bias means is adjustable.

11. A pressure actuated apparatus for sensing fluid pressure within a chamber containing fluid, the apparatus comprising:
a) a housing adapted for affixing to the chamber, the housing provided with sealing means for sealing against leakage of the fluid from the chamber at very high pressures;
b) an internal space within the housing;
c) a flexible diaphragm mounted at a first end of the internal space, the diaphragm separating the internal space from the chamber contents, the diaphragm positioned with a first face exposed to the fluid, and an opposed second face exposed to the internal space;
d) a first annulus connected to the housing and having a face pressed against the first face of the diaphragm;
e) a second annulus on the housing and having a diaphragm face pressed against the second face of the diaphragm, such that the diaphragm is sealingly sandwiched between the two annuli with only a center portion of the diaphragm movable;
f) a cylinder fitting in the second annulus with a sliding fit and having a second end, and a first end to engage, and move with, the second face of the diaphragm as pressure is applied to the first face of the diaphragm;
g) a transducer disposed at a second end of the internal space arranged to provide an electrical response to diaphragm position, the second end of the internal space being defined by the far end of the housing opposite the diaphragm;
h) actuating means operatively connected to the second end of the cylinder arranged to cooperate with the transducer so as to cause the transducer to respond to position of the diaphragm;

i) spring bias means for urging the actuating means toward the diaphragm; and j) rigid stop means for limiting movement of the cylinder away from the diaphragm so that its first end is aligned with the diaphragm face of the second annulus at a preset fixed maximum movement of the diaphragm under pressure from the fluid being sensed, thereby presenting a rigid continuous surface against which the diaphragm is pressed to protect the diaphragm from damage by great pressure applied to its first face by subjecting it to only increased compressive forces from the great pressure.

12. The apparatus according to claim 11, in which the transducer is a Hall-effect device.

13. The apparatus according to claim 12, in which the spring bias means is adjustable.

14. The apparatus according to claim 11, in which the spring bias means is adjustable.

15. The apparatus according to claim 11, in which the transducer is a mechanical switch.

16. The apparatus according to claim 15, in which the spring bias means is adjustable.

17. The apparatus according to claim 11, in which the transducer is a mechanically actuated variable resistor.

18. The apparatus according to claim 17, in which the spring bias means is adjustable.

* * * * *